(12) United States Patent
Kanioz

(10) Patent No.: US 9,732,458 B2
(45) Date of Patent: Aug. 15, 2017

(54) FRICTIONAL VIBRATION DAMPER

(71) Applicant: Aksistem Elektromekanik Sanayi ve Ticaret Ltd. Sti, Kocaeli (TR)

(72) Inventor: Can Kanioz, Kocaeli (TR)

(73) Assignee: Aksistem Elektromekanik Sanayi ve Ticaret Ltd. Sti, Kocaeli (TR)

( * ) Notice: Subject to any disclaimer, the term of this patent is extended or adjusted under 35 U.S.C. 154(b) by 317 days.

(21) Appl. No.: 14/361,670

(22) PCT Filed: Nov. 26, 2012

(86) PCT No.: PCT/EP2012/073576
§ 371 (c)(1),
(2) Date: May 29, 2014

(87) PCT Pub. No.: WO2013/079433
PCT Pub. Date: Jun. 6, 2013

(65) Prior Publication Data
US 2014/0366718 A1  Dec. 18, 2014

(30) Foreign Application Priority Data
Nov. 29, 2011  (EP) .................................. 11191223

(51) Int. Cl.
*F16F 7/09* (2006.01)
*D06F 37/20* (2006.01)
*F16F 9/32* (2006.01)

(52) U.S. Cl.
CPC .............. *D06F 37/20* (2013.01); *F16F 7/09* (2013.01); *F16F 9/3221* (2013.01)

(58) Field of Classification Search
CPC ....................................................... F16F 7/09
See application file for complete search history.

(56) References Cited

U.S. PATENT DOCUMENTS

| 5,183,137 A  * | 2/1993 | Siwek ........................ F16F 7/09 188/129 |
| 5,549,182 A  * | 8/1996 | Ehrnsberger .............. F16F 7/09 188/129 |
| 5,746,418 A  * | 5/1998 | Jansen ..................... B60R 19/28 188/371 |
| 2005/0087414 A1 | 4/2005 | Okimura et al. |
| 2007/0289828 A1 | 12/2007 | Okimura et al. |
| 2012/0073921 A1 | 3/2012 | Okimura et al. |

FOREIGN PATENT DOCUMENTS

| DE | 8623578 U1 | 4/1987 |
| WO | 03074900 A1 | 9/2003 |

* cited by examiner

*Primary Examiner* — F. Daniel Lopez
(74) *Attorney, Agent, or Firm* — Venjuris PC

(57) ABSTRACT

A frictional vibration damper for washing machines is disclosed. The damper comprises a piston body and a piston rod which adapted to move along the primary axis of said piston body. A friction element is located in between the piston rod and the piston body. The piston rod and piston body is equipped with joint at one of their ends for connection to the frame and the drum of the washing machine. The piston rod comprises a tubular body which is made of sheet material and which is fixedly rolled around a carrier piece. The frictional damper according to the present invention preferentially comprises, on one or both sides of the tubular body, with connection elements in the longitudinal direction for engaging to corresponding connection elements located on the carrier piece.

2 Claims, 11 Drawing Sheets

FRICTIONAL VIBRATION DAMPER

TECHNICAL FIELD OF THE INVENTION

The present invention relates to a frictional vibration damper for washing machines, comprising a piston rod which can be telescopically driven in a piston body and a friction element arranged between said piston rod and body for providing a better and less noisy performance of the same during operation.

DESCRIPTION OF THE PRIOR ART

The frictional dampers are capable of effectively reducing vibration and used to dampen and absorb the vibrations generated by the washing machine drums. As is known, in washing machine friction dampers, the friction element interposed between the piston rod and piston body which must be axially restrained in order to properly operate for generating a frictional force when the piston moves inside the piston body.

A frictional vibration damper has been disclosed in WO 03/074900. According to what has been disclosed, a friction vibration damper wherein two rectangular steel sheets are bent into semi-cylinders placed on an H-profiled carrier piece. Using two steel semi cylinders and a coupling ring for attaching the same to each other leads to manufacturing difficulties and high costs. WO 03/074900 discloses a damper formed of two steel semi cylinders placed coaxially with respect to the axis of a carrier piece.

The present invention proposes a damper comprising one tubular body, combined to a carrier piece thereby eliminating the need for using a coupling ring and two semi cylinders shaped steel sheets, resulting in improved heat performance of the damper as well as reduced manufacturing cost. Furthermore, the damper as proposed by the present invention provides a more stable operational connection provided by a plurality of connection elements, placed on the tubular body.

SUMMARY OF THE INVENTION

A frictional vibration damper for washing machines is disclosed. The damper comprises a piston body and a piston rod which adapted to move along the primary axis of said piston body. A friction element is located in between the piston rod and the piston body. The piston rod and piston body is equipped with joint at one of their ends for connection to the frame and the drum of the washing machine. The piston rod comprises a tubular body which is made of sheet material and which is fixedly rolled around a carrier piece. The frictional damper according to the present invention preferentially comprises, on one or both sides of the tubular body, with connection elements in the longitudinal direction for engaging to corresponding connection elements located on the carrier piece. In a more preferred embodiment, the piston body has profile incorporating flexure elements for dampening forces applied outside the primary axis of said piston rod.

OBJECTS OF THE PRESENT INVENTION

Primary object of the present invention is to provide a frictional damper having a piston rod manufactured by rolling a sheet material, thereby providing a simple and cheap design facilitating manufacturing process.

Another object of the present invention is to provide a frictional damper having a piston rod manufactured by rolling a sheet material, said sheet material forming a tubular body supported by a carrier piece thereby enhancing integrity and rigidity of said damper.

Another object of the present invention is to provide a frictional damper whose piston rod is in the form of a tubular body, said tubular body having connection elements along its side edges in the longitudinal direction for maintaining rigidity and integrity of the piston rod during operation of the damper.

Still another object of the present invention is to provide frictional damper having a wavy profile at one end of its piston rod, said wavy profile entrapping lubricant material in order to enhance effective service life of said damper and provide a less noisy operation.

BRIEF DESCRIPTION OF THE DRAWINGS

Accompanying drawings are given in simplified form solely for the purpose of exemplifying the present invention and cannot be considering as limiting the scope of protection defined in the appended claims.

DETAILED DESCRIPTION OF THE INVENTION

Figure 1:
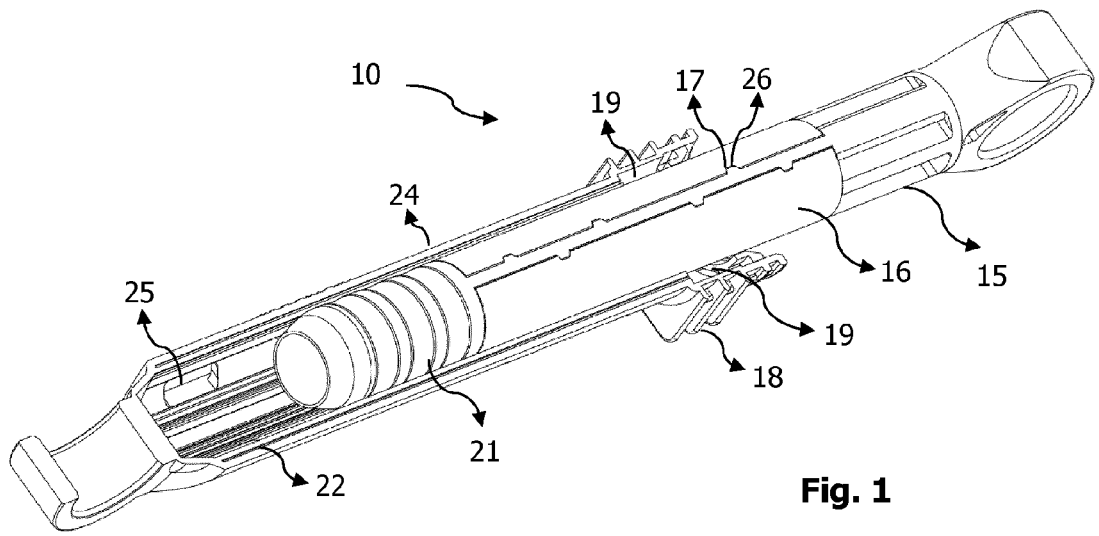
FIG. 1 shows a perspective view of the frictional vibration damper according to the present invention, where the piston body is partly removed for revealing the inside of the damper.

The following numerals are intended for a better understanding of the drawing whose brief descriptions are provided above.

10. Frictional vibration damper
11. Profile of the piston body
12. Cap
13. Cavity
14. Carrier piece
15. Piston rod
16. Tubular body
17. Carrier piece connection element
18. Cooling fin
19. Friction element
20. Ball-and-socket joint
21. Wavy surface
22. Ventilation opening of the piston body
23. Fitting groove
24. Piston body
25. Rectangular ventilation opening
26. Tubular body connection element
27. Flexure elements
28. Gap
29 Carrier piece connection hole
30 Halve
31 Fitting protrusion
32 longitudinal shrink Hereinafter, preferred embodiments of the present invention will be described in detail with reference to the accompanying drawings which are given solely for the purpose of exemplifying embodiments according to the present invention.

Illustrated as a perspective view in FIG. 1 piston rod (15) and friction element (19) encircling said piston rod (15) and fixed to the piston body (24) are fitted in place so as to dampen vibrations encountered during operation of a washing machine. The friction element (19) is configured to dampen vibrations and convert kinetic energy to heat energy inside the piston body (24) as a result of friction. Referring back to FIG. 1, said frictional heat energy created during the operation of the frictional vibration damper (10) is discharged by a plurality of cooling fins (18). Said cooling fins (18) protrude from the outer surface surrounding the piston body (24) underneath of which the friction element (19) exists. Moreover, frictional heat is also discharged through rectangular ventilation openings (25) formed at the inner part of the piston body. Said ventilation openings (25) prevent the compression of the air within the damper (10) through air exchange with the outside of the piston body (24) during operation.

Figure 3:
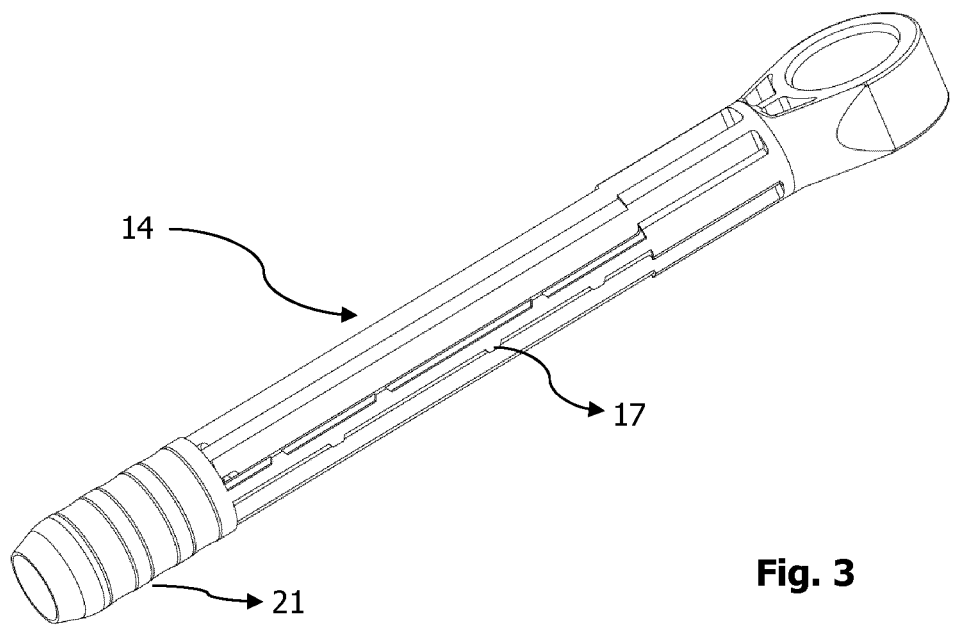
FIG. 3 shows a perspective view of the carrier piece according to the present invention.
Figure 4:
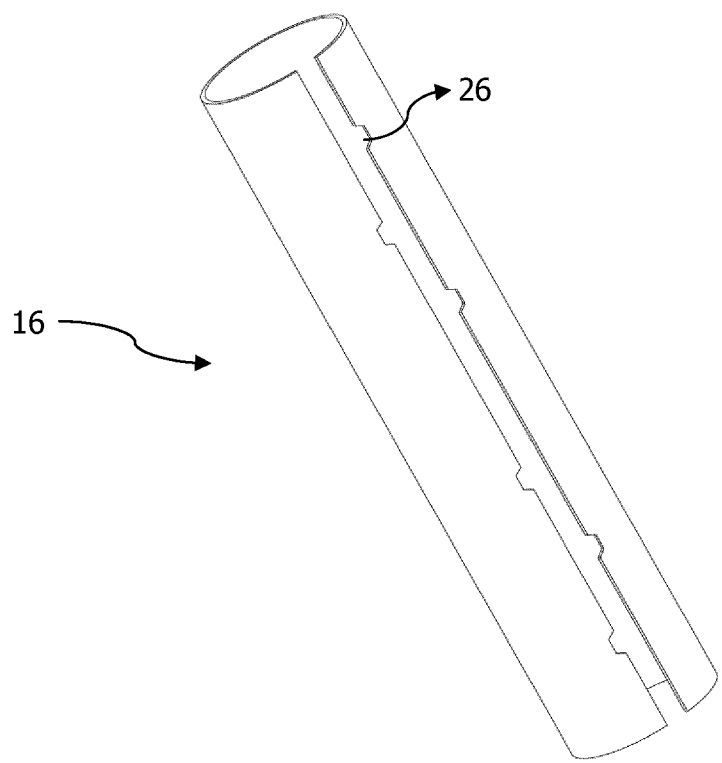
FIG. 4 shows a perspective view of the tubular body for forming the piston rod according to the present invention.
Figure 5:
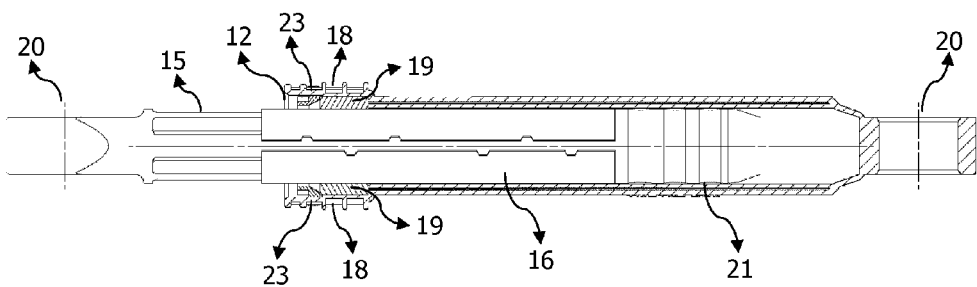
FIG. 5 shows a perspective view of the inside of the frictional vibration damper according to the present invention, where the piston body is partly removed for revealing the inside of the damper.

The damper according to the present invention (10) comprising a tubular body (16) is supported by a carrier piece (14) which provides a more stable and integral structure especially when the plurality of connection elements (17) formed on said carrier piece (14) engages with corresponding connection elements (26) formed on the sides of said tubular body (16). Illustrated as perspective views in FIG. 3 and FIG. 4 said carrier piece connection elements (26) being placed on said tubular body (16) provides a reliable connection during the vibratory and to-and-fro movement of the piston rod (15).

Figure 11:
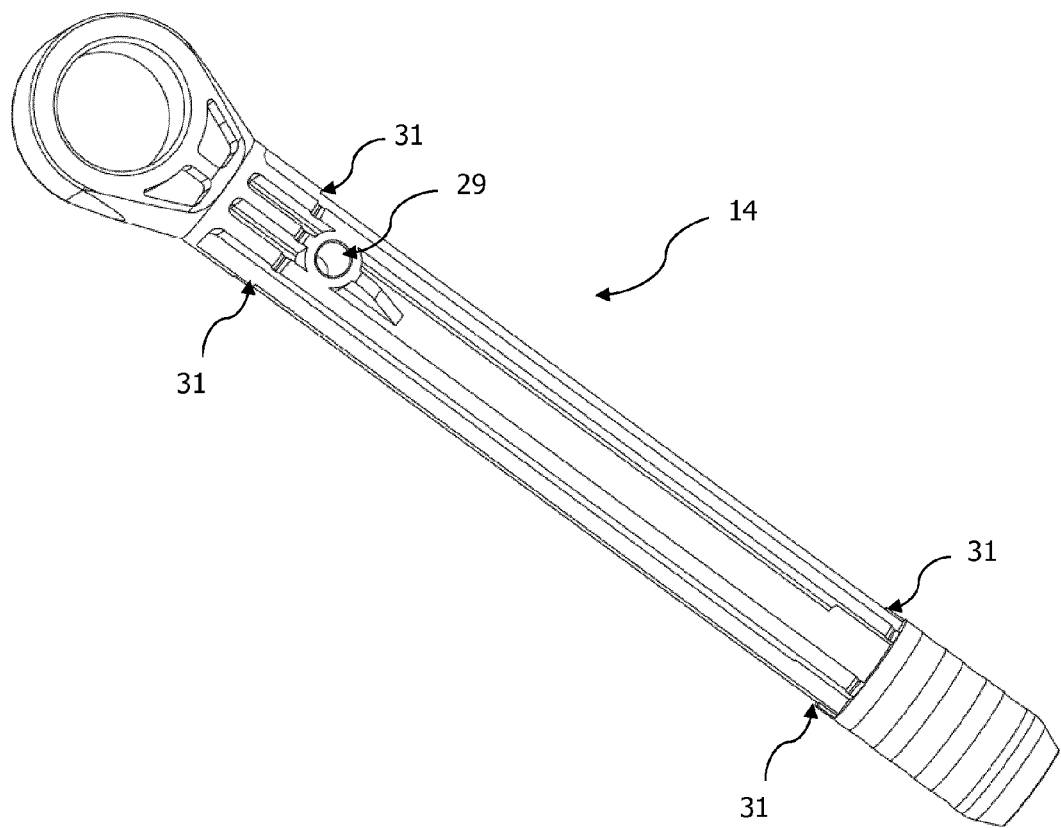
FIG. 11 shows a perspective view of the carrier piece according to an alternative embodiment of the present invention.

Illustrated as perspective view in FIG. 11 carrier piece connection hole (29) is formed on the upper portion of the carrier piece (14). Illustrated as perspective view in FIG. 13 tubular body (16) made of sheet material fixedly rolled around on both sides a carrier piece (14). A plurality of connection holes (26) formed on the upper portion of tubular body (16) is used to join tubular body (16) by crimping process. Crimping process hold tubular body (16) and carrier piece (14) together strictly by means of deforming the sheet metal around said holes (29, 26) which are formed on the upper portions. A plurality of tubular body connection elements (26) are formed symmetrical on the said tubular body (16) such that said tubular body can be mounted in an interchangeable manner with its two halves (30) of cylindrical lateral surfaces being symmetrical, thereby helping in reducing production time. In the event that excessive heat is generated due to the friction, said tubular body connection element (26) is adapted to reduce strain which occurs at the connection area.

Said carrier piece connection holes (29) form a linearly extending tubular channel to enhance air circulation useful in discharging accumulated heat. Said connection element (26) constitute circular holes juxtaposing with said connection holes (29) to provide an air channel extending from a tubular body connection element (26) on said tubular body, through said two carrier piece connection holes (29) on two sides, to the tubular body connection element (26) on the other side of said tubular body (16).

Figure 12:
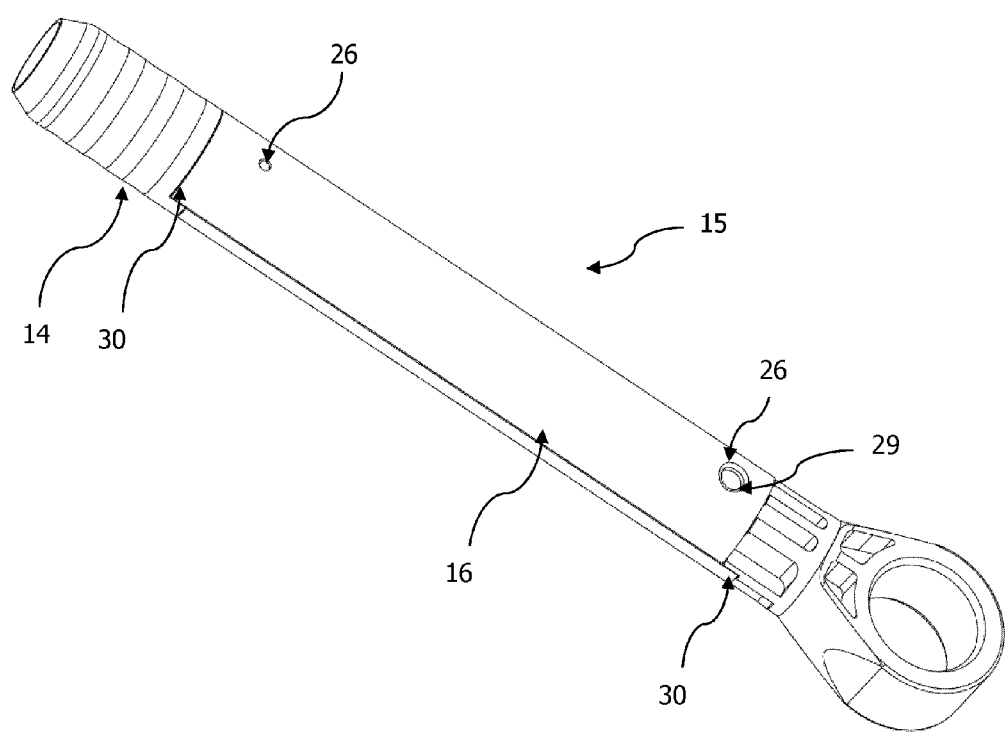
FIG. 12 shows a perspective view of the piston rod according to the alternative embodiment of FIG. 11.
Figure 13:
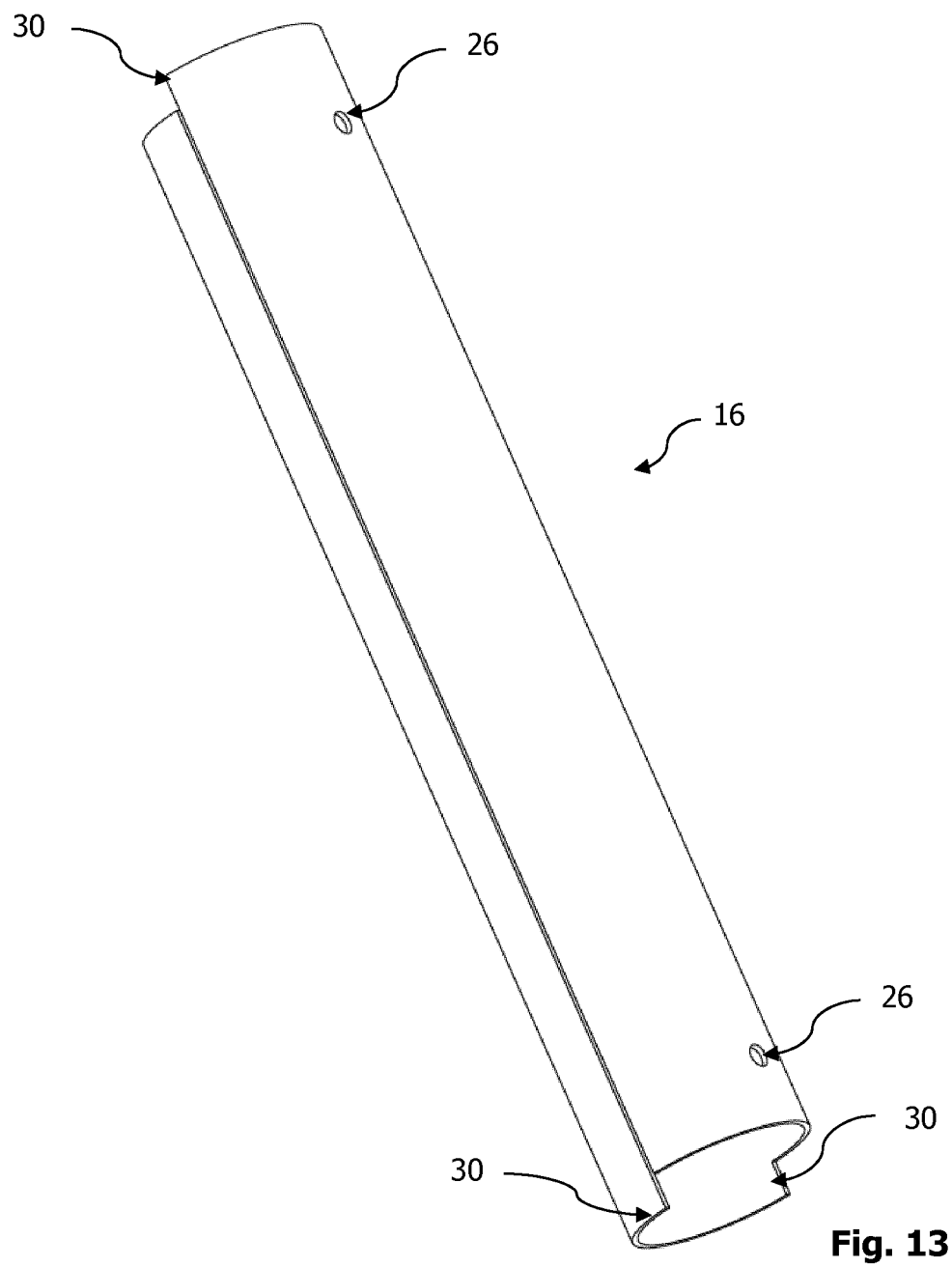
FIG. 13 shows a perspective view of the tubular body for forming the piston rod according to the alternative embodiment of FIG. 11.

Said tubular body (16) lateral cylindrical half surfaces are provided with projections (30) at both ends thereof to enable improved stability by connecting a plurality of fitting protrusions (31) which are formed at the lower and upper portion of said carrier piece (14). Said carrier piece (14) in return comprises a plurality of respective slots (31) at the both sides for receiving said projections (30) at both ends. This embodiment of the present invention as shown in FIG. 11 to 13 is therefore advantageous in eliminating heat accumulation and stability problems.

Figure 2:
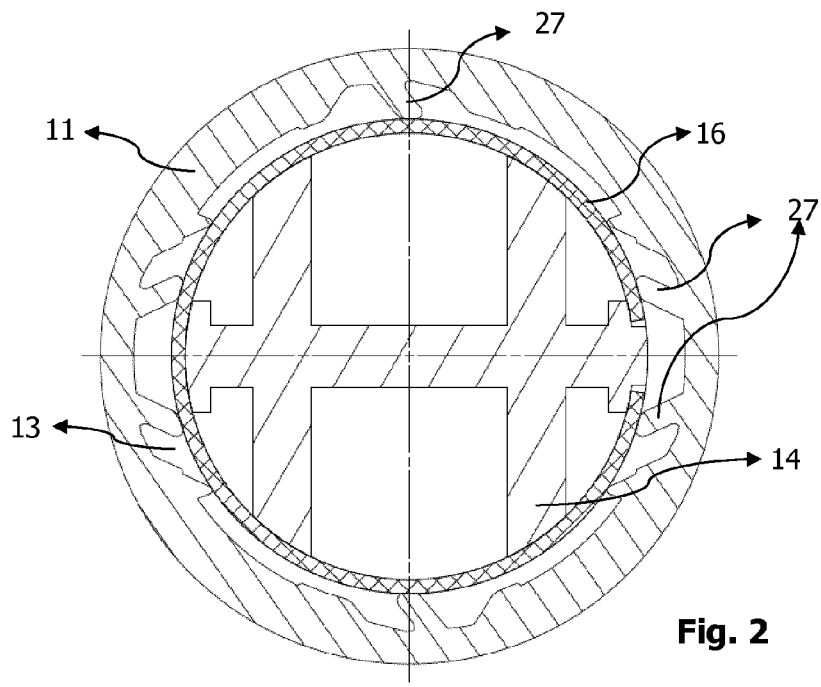
FIG. 2 shows a cross-sectional view of the frictional vibration damper according to the present invention.

The profile (11) of the piston body (24) helps to dampen forces which apply outside the primary axis of said piston rod (10), since the profile (11) is equipped with a plurality of flexure elements (27) distributed around its inner periphery. Cavities (13) have been formed in the inner part of the profile (11) in order to increase elasticity of the flexure elements (27) of the profile (11) as illustrated in the cross sectional view of FIG. 2.

Connection elements (17) of the carrier piece (14) are adapted to engage corresponding connection elements (26) on the longitudinal sides of the tubular body (16) in order to better fasten the tubular body (16) on said carrier piece (14) and increase integrity and rigidity of the piston rod (15). The shape of the connection elements (17) may be circular, conical, triangular, rectangular, pentagonal, hexagonal or any other shape that is suitable for inter engaging to the corresponding connection element (26) formed on the sides of the tubular body (16). It is obvious to the skilled man in the art that either the sides of the tubular body (16) or the surface of the carrier piece (14) may be equipped with male or female connection elements for fitting to the counter fitting element (17,26) and gap (28).

The frictional damper according to the present invention is designed to be attached to the frame on the one end and to the drum of a washing machine on the other end by means of ball and socket joints (20) placed on the respective ends of the piston body (24) and piston rod (15), as is well known in the art.

Figure 6:
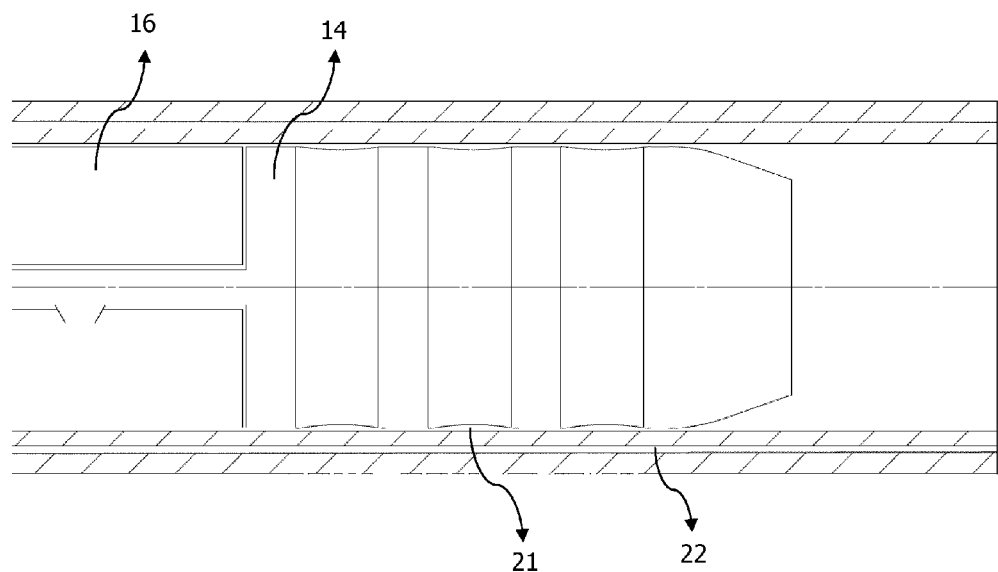
FIG. 6 shows an enlarged view of the piston rod end shown in FIG. 5.

As shown in FIG. 6, one end of said carrier piece (14) has a wavy surface (21) when looked from the side, the wavy surface providing gaps in between the end of the carrier piece (14) and piston body (24). Lubricant is entrapped within the gaps in order to facilitate co-axial movement of the piston rod (15) within the piston body (24). This allows use of a shorter tubular body (16), which in turn is advantageous in that it reduces the noise level during operation. Moreover, said wavy form of the carrier piece (14) helps to keep lubricant as well as providing and enhanced heat exchange with the environment of the piston rod.

Figure 14:
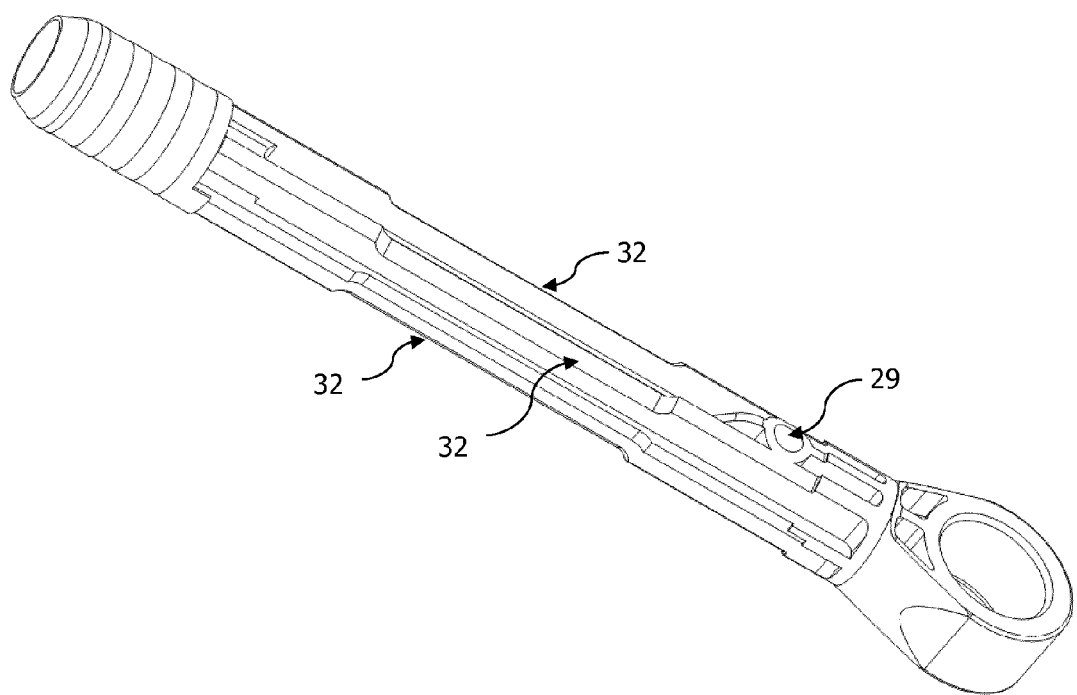
FIG. 14 shows a perspective view of the carrier piece according to an alternative embodiment of the present invention.
Figure 15A:
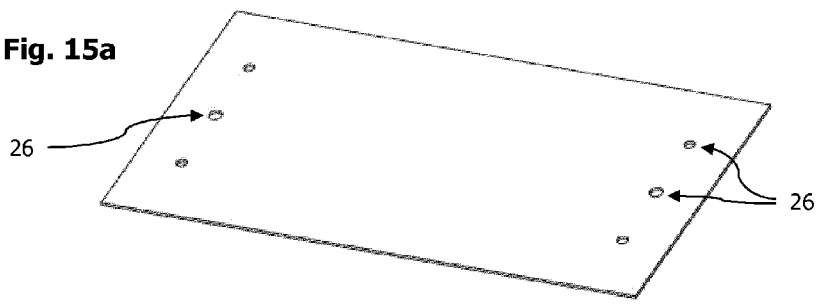
FIG. 15a shows the sheet material used for forming the tubular body according to the present invention; the sheet material has a plurality of holes for crimping into a corresponding hole of the carrier piece.
Figure 15B:
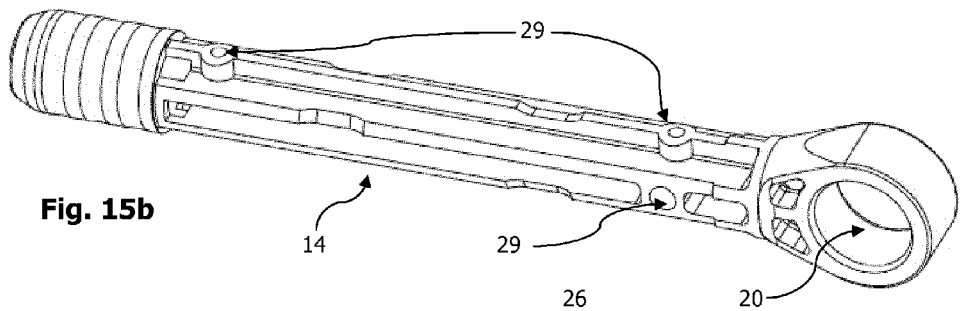
FIG. 15b shows a carrier piece having a plurality of connection holes along its primary axis.
Figure 15C:
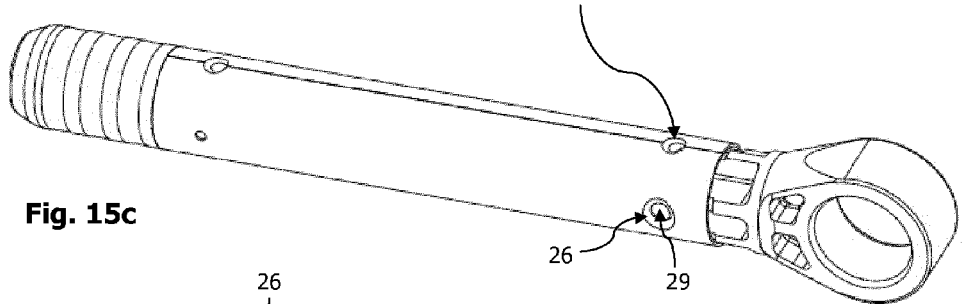
FIG. 15c shows a sheet material as rolled on a carrier piece, said sheet material having semi-circle holes along its side edges in the longitudinal direction for forming full circle holes when said sheet material is rolled onto said carrier piece.
Figure 15D:
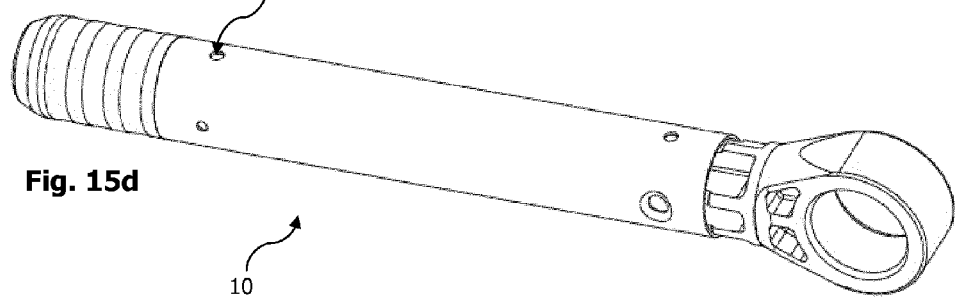
FIG. 15d shows the sheet material of FIG. 15a as rolled on the carrier piece shown in FIG. 15b.

FIG. 14 shows another embodiment of the present invention. According to this embodiment longitudinal shrinks (32) are formed on the upper portion of carrier piece (14), may be used to enhance air flow of the piston rod (15). By means of said longitudinal shrink (32) it may be possible to provide better cooling of damper having similar or better performances than a conventional frictional damper, but with a smaller size and weight as well as being silent.

Figure 7:
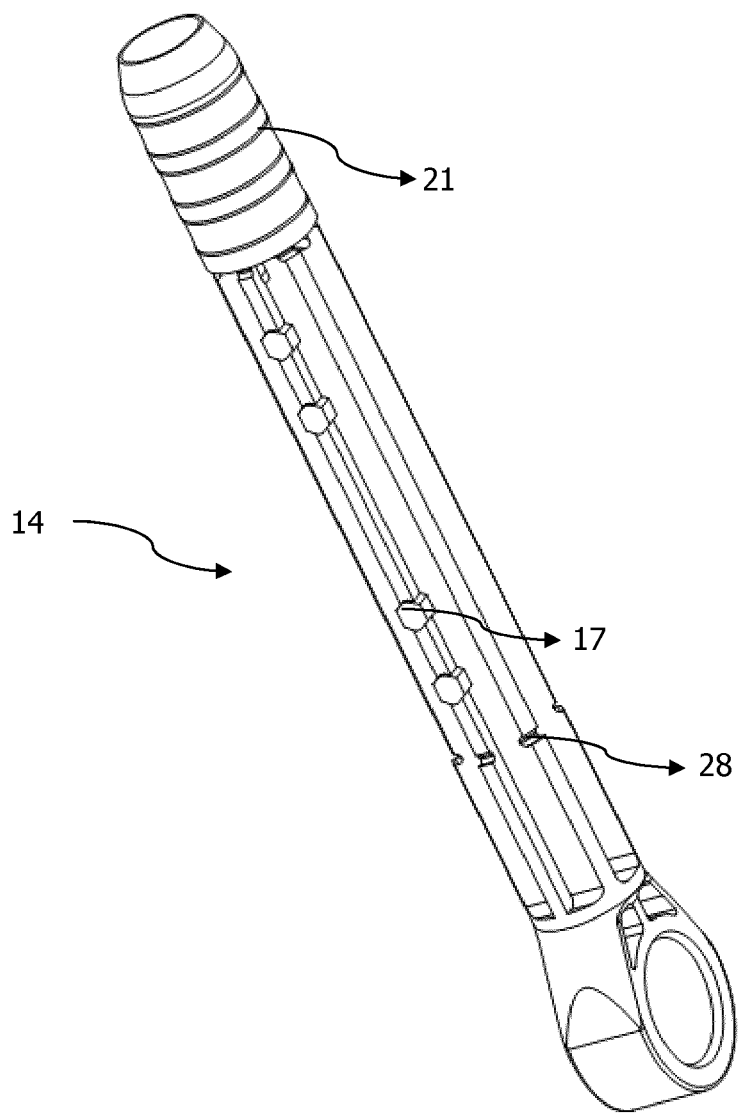
FIG. 7 shows a perspective view of the carrier piece according to an alternative embodiment of the present invention.
Figure 8:
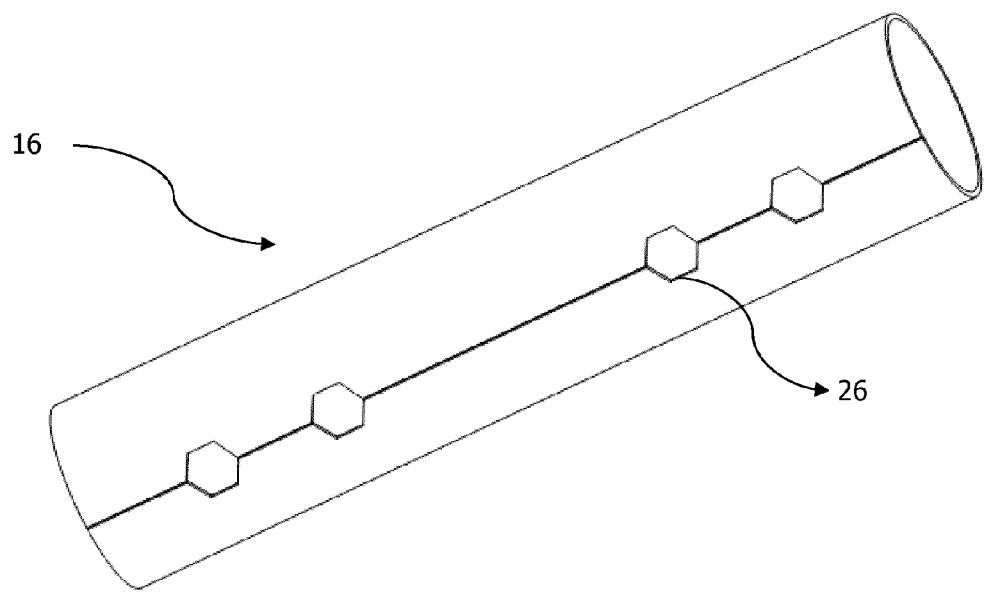
FIG. 8 shows a perspective view of the tubular body for forming the piston rod according to an alternative embodiment of the present invention.
Figure 9:
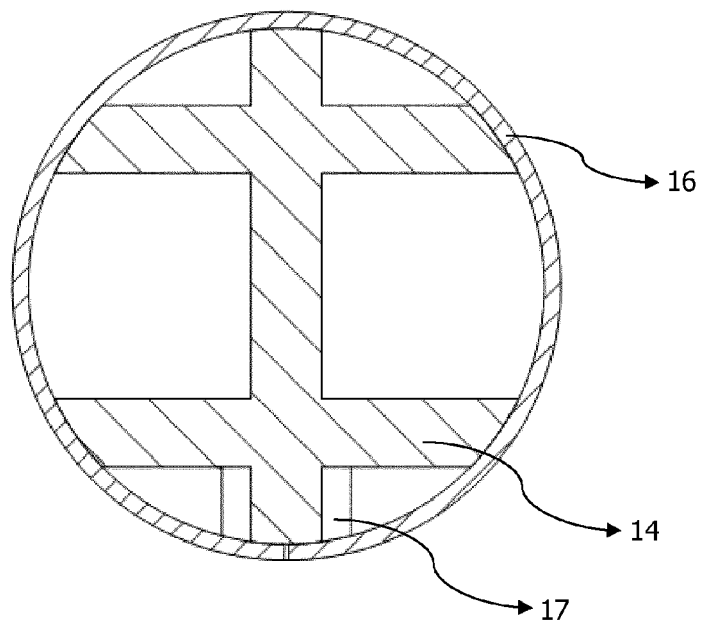
FIG. 9 shows a cross-sectional view of the frictional vibration damper according to an alternative embodiment of the present invention.
Figure 10:
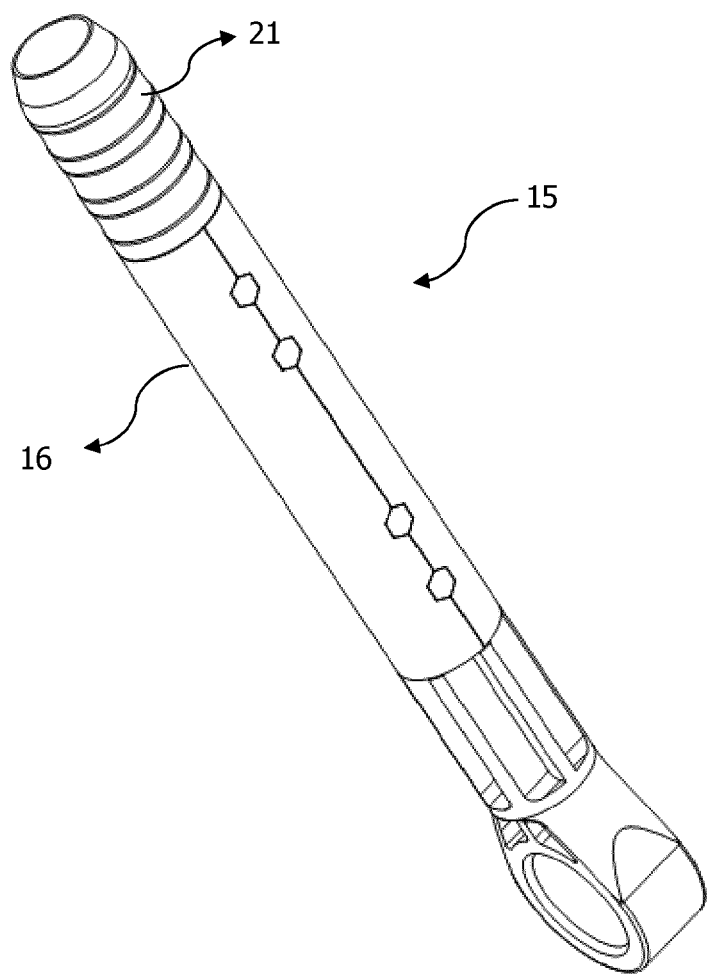
FIG. 10 shows a perspective view of the piston rod according to an alternative embodiment of the present invention.

Said carrier piece (14), on the surface of which connection elements (17) are formed, is preferably made of plastic material. Said connection elements (17) ensure that the tubular body (16) can be placed coaxially with respect to the longitudinal axis of the carrier piece (14) such that said tubular body (16) is fixedly attached to said carrier piece (14) and move together with said carrier piece (14) integrally. While connection elements (17,26) and gap (28), formed on carrier piece (14) as shown in FIG. 7, may be used to enhance integrity of the piston rod (15), the tubular body (16) may be rolled or pressed on and around the carrier piece (14) so as to engage with an interference fit or with a tight fit.

Fitting grooves (23) may be provided on or around the piston body (24) in order to facilitate insertion of a cap (12) to the piston body (24), thereby restricting movement of the friction element (19) on the primary axis of the piston rod (15).

The invention claimed is:

1. A frictional vibration damper (10) for washing machines said damper comprising a piston body (24) and a piston rod (15) adapted to move telescopically along the primary axis of said piston body (24), a friction element 5 (19) located in between said piston rod and said piston body such that friction occurs when said piston moves with respect to said body, said piston rod and piston body respectively having a joint (20) at one ends, characterized in that said piston rod (15) is formed by a carrier piece (14) around which a tubular body (16) is crimped and wherein both sides of said carrier piece (14) is provided with a plurality of longitudinal fitting protrusions (31) for engaging to corresponding lateral cylindrical half surfaces (30) formed on tubular body (16).

2. A frictional vibration damper (10) for washing machines said damper comprising a piston body (24) and a piston rod (15) adapted to move telescopically along the primary axis of said piston body (24), a friction element 5 (19) located in between said piston rod and said piston body such that friction occurs when said piston moves with respect to said body, said piston rod and piston body respectively having a joint (20) at one ends, characterized in that said piston rod (15) is formed by a carrier piece (14) around which a tubular body (16) is crimped and wherein said carrier piece (14) comprises carrier piece connection holes (29) and connection elements (26) forming a linearly extending tubular channel.

* * * * *